Patented May 18, 1954

2,678,902

UNITED STATES PATENT OFFICE 2,678,902

HAND LOTION

Robert James Mehaffey, River Edge, N. J., assignor to Colgate-Palmolive Company, Jersey City, N. J., a corporation of Delaware No Drawing. Application November 6, 1950, Serial No. 194,377

2 Claims. (Cl. 167—91)

This invention relates to a new composition of matter and more particularly to a new composition of matter that finds particular utility as a hand lotion.

Hand lotions are, generally speaking, oil-in-water emulsions containing components intended to impart the desired effect to the skin. It is important that the lotion contain an emulsifying agent to bring about the desired emulsification in the first instance and a stabilizing agent to insure that the components shall be maintained evenly distributed throughout the emulsion and that when the lotion is applied to the skin it will make efficient contact therewith. The prior art discloses many emulsifying agents and stabilizing agents that have been used in cosmetics of various sorts but none of these perform their function when used in cosmetics to a fully satisfactory degree. The lotions were, in some cases, not fully emulsified and frequently separated into 2-phase mixtures of water and oil. The lotions had to be shaken prior to each use to re-establish the emulsion. Then, too, the stabilizing agent was not always satisfactory and the finely divided material of the internal phase would tend to come out of emulsion causing separation of the two phases in layer form. Also, the lotions containing the prior art agents had relatively poor application qualities, that is, the ability of the lotion to adhere smoothly and evenly to the skin was not all that was desired.

It is therefore an object of this invention to provide a hand lotion which eliminates the disadvantages of lotions of the prior art.

It is a further object of this invention to provide a hand lotion having a novel combination of stabilizing and emulsifying agents which results in a hand lotion with surprisingly good application qualities.

More particularly, it is an object of this invention to provide a hand lotion that has incorporated therein an emulsifying agent and a stabilizing agent that in combination maintain the finely divided particles of the emulsion evenly distributed throughout and permits the lotion to adhere smoothly and evenly to the skin.

According to the present invention the foregoing and related objects are obtained by adding to an oil-in-water emulsion containing other components necessary for imparting desired properties to the mixture when used as a hand lotion, a water soluble alkali metal carboxyalkylcellulose, such as sodium carboxymethylcellulose, as the emulsifying agent and a colloidal magnesium aluminum silicate gel as the stabilizing agent. The result of incorporating these two ingredients in a lotion is the production of a stable product with good application qualities, and good color and odor. Additionally, these two ingredients are much more easily reproducible as regards uniformity of their properties from batch to batch than are natural gums which have heretofore been proposed for the purpose.

A typical example of the application of the present invention is as follows. A composition of the following formula:

| | Per cent by weight |
|---|---|
| Water | 80.36 |
| Sodium carboxymethylcellulose | 1.00 |
| Colloidal magnesium aluminum silicate, e. g., "Veegum" | 1.25 |
| Borax | 0.54 |
| Methyl p-hydroxy benzoate (preservative) | 0.15 |
| Waxes (glyceryl monostearate, spermaceti, beeswax) | 6.00 |
| Vegetable oil, e. g., tristearin | 2.20 |
| Perfume oil | 0.50 |
| Alcohol | 8.00 |
| | 100.00 | is produced by the following method:

The borax and methyl p-hydroxy benzoate (preservative) are dissolved in water, the magnesium aluminum silicate gel and the sodium carboxymethylcellulose, previously mixed together while dry, are slowly added to the water. Agitation is continued for about ten minutes, at which time the solution is heated to about 185° F. It may be noted that this temperature is not critical but merely a preferred temperature, it also being possible to incorporate these additives at higher temperatures if desired. When the temperature has reached about 185° F. in the preferred form of the process, the waxes and oils that have been previously heated also to 185° F. are slowly added. The lotion is then cooled to about 95° F., at which time the alcohol and perfume previously mixed together are slowly added. Agitation is continued for about two minutes and the resulting stabilized, emulsified product is then bottled for use.

The above-mentioned procedure results in an extremely good hand lotion, one that is generally superior in all of its qualities to those previously produced in the prior art.

In making up various hand lotion formulations the alkali metal carboxyalkylcellulose component may vary from about 0.1% to about 1.2% by weight and the colloidal magnesium aluminum silicate component (dry basis) may vary from about 0.5% to about 2.0% by weight, depending upon the desired viscosity of the final lotion. The remaining components may be varied over very wide limits both as to kind and as to ratios amongst themselves, as will be readily apparent to those skilled in the cosmetics arts.

What has been described is a preferred embodiment of the invention. Other embodiments obvious to one skilled in the art from this disclosure are also included within the scope and spirit of the following claims.

What is claimed is:

1. A hand lotion comprising an oil-in-water emulsion, and from about 0.5% to about 2.0% of colloidal magnesium aluminum silicate gel and from about 0.1% to about 1.2% of sodium carboxymethylcellulose.

2. A hand lotion comprising an oil-in-water emulsion of waxes, water and alcohol, and from about 0.5% to about 2.0% of colloidal magnesium aluminum silicate gel and from about 0.1% to about 1.2% of sodium carboxymethylcellulose.

References Cited in the file of this patent

Bennett: Chemical Formulary, vol. VIII (1948), pages 50, 75.

Huyck: Journal of the Am. Pharm. Ass'n., Prac. Pharm. Ed., March 1950, pages 170 to 172.

Davies: Soap, Perfumery and Cosmetics, May 1948, pages 684, 685, 686.

Hollabaugh: Industrial and Engineering Chemistry, October 1945, p. 945.

Harry: Cosmetic Materials, vol. 2 (1950), pp. 296, 297.

Bennett: Chemical Formulary, vol. 8 (1948), p. 52.

Hollabaugh: Industrial and Engineering Chemistry, October 1945, vol. 37, pp. 943, 944, 946, 947.

Veegum—pub. by R. T. Vanderbilt & Co., pp. 1 to 4 (September 1946).

Goodman: Cosmetic Dermatology (1936), page 352.

Veegum for Cosmetic and Industrial Use, September 1946, pp. 18 to 20.